US006171716B1

United States Patent
Sasaki et al.

(10) Patent No.: US 6,171,716 B1
(45) Date of Patent: Jan. 9, 2001

(54) SOFT MAGNETIC FILM, AND THIN FILM MAGNETIC HEAD, PLANER MAGNETIC ELEMENT, AND FILTER USING THE SOFT MAGNETIC FILM

(75) Inventors: Yoshito Sasaki; Makoto Nakazawa; Takashi Hatanai; Akihiro Makino, all of Niigata-ken (JP)

(73) Assignee: ALPS Electric Co., Ltd. (JP)

( * ) Notice: Under 35 U.S.C. 154(b), the term of this patent shall be extended for 0 days.

(21) Appl. No.: 09/313,924

(22) Filed: May 18, 1999

(30) Foreign Application Priority Data

May 26, 1998 (JP) .................................................. 10-144198

(51) Int. Cl.[7] ........................................................ B32B 9/00
(52) U.S. Cl. .......................... 428/692; 360/110; 427/128; 427/132; 428/702; 428/704; 428/900
(58) Field of Search ..................................... 428/692, 702, 428/704, 900; 360/110; 427/128, 132

(56) References Cited

U.S. PATENT DOCUMENTS 5,302,469   4/1994   Sugenoya et al. .
5,573,863   11/1996  Hayakawa et al. .
5,656,101   8/1997   Hayakawa et al. .
5,725,685   3/1998   Hayakawa et al. .

FOREIGN PATENT DOCUMENTS 2-199027    8/1990   (JP) .
6-316748    11/1994  (JP) .
10-55916    2/1998   (JP) .

*Primary Examiner*—Bernard Pianalto
(74) *Attorney, Agent, or Firm*—Brinks Hofer Gilson & Lione

(57) ABSTRACT

A soft magnetic film includes Fe as a major constituent; at least one element M selected from the group consisting of Zr, Hr, V, Nb, Ta, W, Mo, and rare earth elements (excluding Sm); at least one element L selected from the group consisting of Ti, Sn, Sm, and Si: and at least one element R selected from the group consisting of O, C, and N. The film has a structure including a mixture of an amorphous phase containing a large amount of the oxide of the element M and a fine crystalline phase containing a large amount of Fe, and the fine crystalline phase further contains the element L. Thin film magnetic heads, planar magnetic elements, and filters using the soft magnetic film are also disclosed.

24 Claims, 4 Drawing Sheets

SOFT MAGNETIC FILM, AND THIN FILM MAGNETIC HEAD, PLANER MAGNETIC ELEMENT, AND FILTER USING THE SOFT MAGNETIC FILM

BACKGROUND OF THE INVENTION

1. Field of the Invention

The present invention relates to soft magnetic films for use as, for example, magnetic layers in thin film magnetic heads, and magnetic cores in inductors or the like, and more particularly, to soft magnetic films in which a magnetostriction constant can be reduced while maintaining soft magnetic properties and to thin film magnetic heads, planar magnetic elements (e.g., transformers and inductors), and filters using the soft magnetic films.

2. Description of the Related Art

For soft magnetic films used as magnetic layers in thin film magnetic heads, planar magnetic elements (e.g., transformers and inductors), or magnetic cores in filters or the like, materials having excellent soft magnetic properties such as resistivity and magnetic permeability, particularly at high frequencies, are required.

An Fe—M(such as Zr, Hf, and Ta)—O system alloy film is considered to be a soft magnetic film having excellent high frequency characteristics. Since this soft magnetic film has high resistivity, eddy current loss can be reduced. The film also exhibits high magnetic permeability at high frequency bands.

However, the Fe—M(such as Zr, Hf and Ta)—O system alloy has a high magnetostriction constant, specifically, of approximately $4 \times 10^{-6}$ to $6 \times 10^{-6}$.

It is thought that the Fe—M(such as Zr, Hf, and Ta)—O system alloy film includes a fine crystalline phase having a bcc structure containing mainly Fe and an amorphous phase, which surrounds the fine crystalline phase, composed of the oxide of the element M such as Hf. Therefore, presumably it is mainly the fine crystalline phase containing a large amount of Fe that generates magnetism. The reason for an increase in magnetostriction of the soft magnetic film is that Fe which constitutes the fine crystalline phase has large magnetostriction. Additionally, since the fine crystalline phase is not composed of Fe alone and also contains impurities such as Hf and O, the impurities are considered to affect the magnetostriction of the soft magnetic film.

When the Fe—M(such as Zr, Hf, and Ta)—O system alloy having a high magnetostriction constant is used for magnetic layers in thin film magnetic heads or magnetic cores in inductors, soft magnetic properties such as magnetic permeability of the soft magnetic films are easily degraded. Additionally, because of the relationship between internal stress and magnetostriction in the deposited soft magnetic film, the degradation of soft magnetic properties or the separation of the film easily occurs in the soft magnetic film.

SUMMARY OF THE INVENTION

The present invention overcomes the difficulties noted above with respect to the conventional art. It is an object of the present invention to provide soft magnetic films in which a magnetostriction constant can be reduced while maintaining soft magnetic properties such as resistivity and magnetic permeability, and to provide thin film magnetic heads, planar magnetic elements, and filters using the soft magnetic films.

In accordance with the present invention, a soft magnetic film contains Fe as a major constituent, at least one element M selected from the group consisting of Zr, Hf, V, Nb, Ta, W, Mo, and rare earth elements (excluding Sm), at least one element L selected from the group consisting of Ti, Sn, Sm, and Si, and at least one element R selected from the group consisting of O, C, and N. The film has a structure which includes a mixture of an amorphous phase containing a large amount of the oxide of the element M and a fine crystalline phase containing a large amount of Fe, and the fine crystalline phase further contains the element L.

The fine crystalline phase is preferably composed of at least one structure selected from the group consisting of a body-centered cubic (bcc) structure, a hexagonal closest packed (hcp) structure, and a face-centered cubic (fcc) structure. More preferably, the fine crystalline phase is composed mainly of a bcc structure.

In the present invention, the fine crystalline phase has an average crystal grain size, preferably, of 30 nm or less, and more preferably, of 10 nm or less.

In accordance with the present invention, a soft magnetic film has a composition represented by the formula:

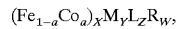

where the element M includes at least one element selected from the group consisting of Zr, Hf, V, Nb, Ta, W, Mo, and rare earth elements (excluding Sm), the element L includes at least one element selected from the group consisting of Ti, Sn, Sm, and Si, the element R includes at least one element selected from the group consisting of O, C, and N, the subscript a satisfies $0 \leq a \leq 0.1$, and X, Y, Z, and W (in atomic percent) satisfy $45 \leq X \leq 70$, $5 \leq Y \leq 30$, $0.1 \leq Z \leq 10$, and $10 \leq W \leq 40$, respectively.

In the present invention, preferably, the element L includes at least one element selected from the group consisting of Ti, Sn, and Sm, and the subscript Z satisfies $0.1 \leq Z \leq 2$.

In the present invention, preferably, the subscript W satisfies $30 \leq W \leq 40$.

The soft magnetic film in the present invention may have a magnetostriction constant of $4 \times 10^{-6}$ or less in absolute value, a resistivity of 400 to 1,200 $\mu\Omega \cdot$cm, and a magnetic permeability of 300 or more.

In accordance with the present invention, in a thin film magnetic head which includes a write head and/or a read head, at least one magnetic layer constituting the write head and the read head is composed of the soft magnetic film described above.

In accordance with the present invention, a planar magnetic element and a magnetic core of a filter are formed using the soft magnetic film.

DESCRIPTION OF THE PREFERRED EMBODIMENT

Figure 1:
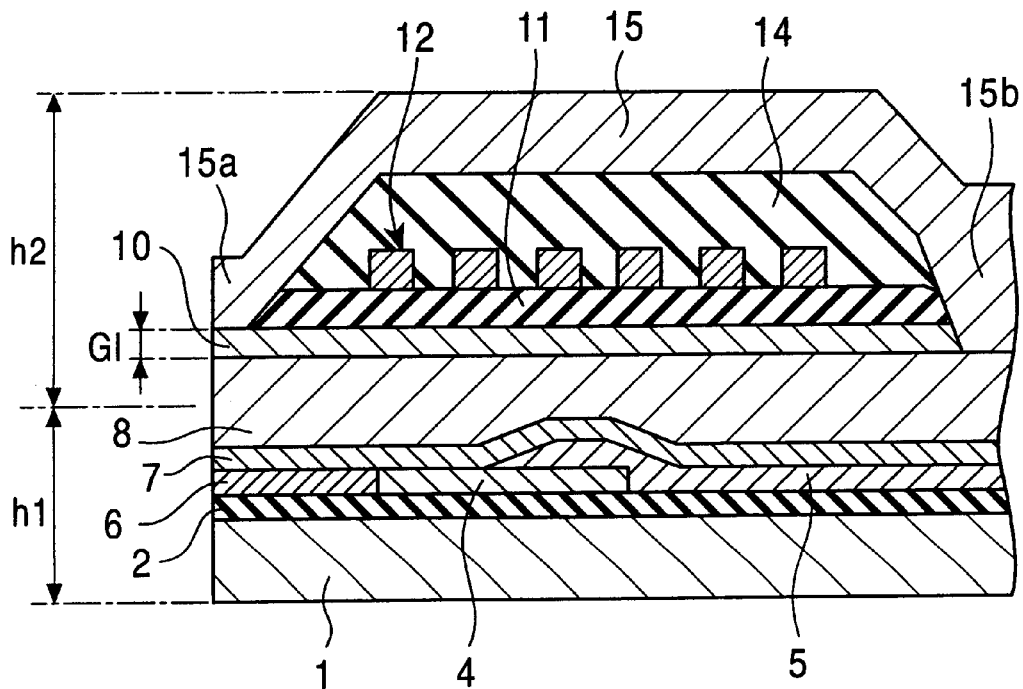
FIG. 1 is a longitudinal sectional view of a thin film magnetic head in accordance with the present invention.

Fe—M(such as Zr, Hf, and Ta)—O system alloys are known to be soft magnetic films having excellent high frequency characteristics as disclosed in Japanese Unexamined Patent Publication No. 6-316748.

In the soft magnetic film, a fine crystalline phase containing mainly Fe having a bcc structure is surrounded by an amorphous phase containing mainly an oxide of Hf. Since the soft magnetic film contains the oxide of Hf, it is considered that the soft magnetic film has a high resistivity and that eddy current loss can be reduced.

However, the Fe—M(such as Zr, Hf, and Ta)—O system alloy has a high magnetostriction constant, specifically, of approximately $4 \times 10^{-6}$ to $6 \times 10^{-6}$. Therefore, in order to implement the use of the soft magnetic film for magnetic layers in thin film magnetic heads or magnetic cores in inductors, the magnetostriction constant of the soft magnetic film must be reduced.

When the soft magnetic film is formed as a magnetic layer of a thin film magnetic head or a magnetic core of an inductor, because of large magnetostriction, soft magnetic properties such as magnetic permeability are significantly degraded. Additionally, because of the relationship between internal stress and magnetostriction in the deposited soft magnetic film, the degradation of soft magnetic properties or the separation of the film easily occurs in the soft magnetic film.

One of the causes of an increase in magnetostriction of the soft magnetic film is that Fe which constitutes the fine crystalline phase has large magnetostriction. The mixing of impurities such as Hf into the fine crystalline phase is also assumed to be responsible.

Accordingly, in the present invention, an element is added to the soft magnetic film, which can reduce the magnetostriction of Fe by being dissolved in Fe constituting the fine crystalline phase, thus enabling the reduction of the magnetostriction of the entire soft magnetic film. In the present invention, by adding an element L comprising at least one element selected from the group consisting of Ti, Sn, Sm, and Si to an Fe—M(such as Hf)—R(such as O) alloy film, the magnetostriction constant of the soft magnetic film is decreased while maintaining satisfactory soft magnetic properties.

A soft magnetic film in accordance with the present invention will be described as follows.

In accordance with the present invention, a soft magnetic film contains Fe as a major constituent, at least one element M selected from the group consisting of Zr, Hf, V, Nb, Ta, W, Mo, and rare earth elements (excluding Sm), at least one element L selected from the group consisting of Ti, Sn, Sm, and Si, and at least one element R selected from the group consisting of O, C, and N. A specific composition of the soft magnetic film is represented by the formula:

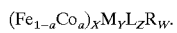

In the soft magnetic film described above, Fe is ferromagnetic, and thus it is an element which is responsible for magnetism. Although a higher content of Fe is desirable in order to obtain high saturation flux density, if the Fe content is 70 at % or more, resistivity significantly decreases, which is undesirable. On the other hand, if the Fe content is below the range specified in the present invention, saturation flux density decreases, which is undesirable.

The element M comprising at least one element selected from the group consisting of Zr, Hf, V, Nb, Ta, W, Mo, and rare earth elements (excluding Sm) is necessary in order to make soft magnetic properties compatible with high resistivity. The above elements easily combine with oxygen to form oxides. For example, when Hf is used as the element M, Hf combines with O to form $HfO_2$, thus forming an oxide. By adjusting the content of the oxide of the element M, resistivity can be increased.

Figure 4:
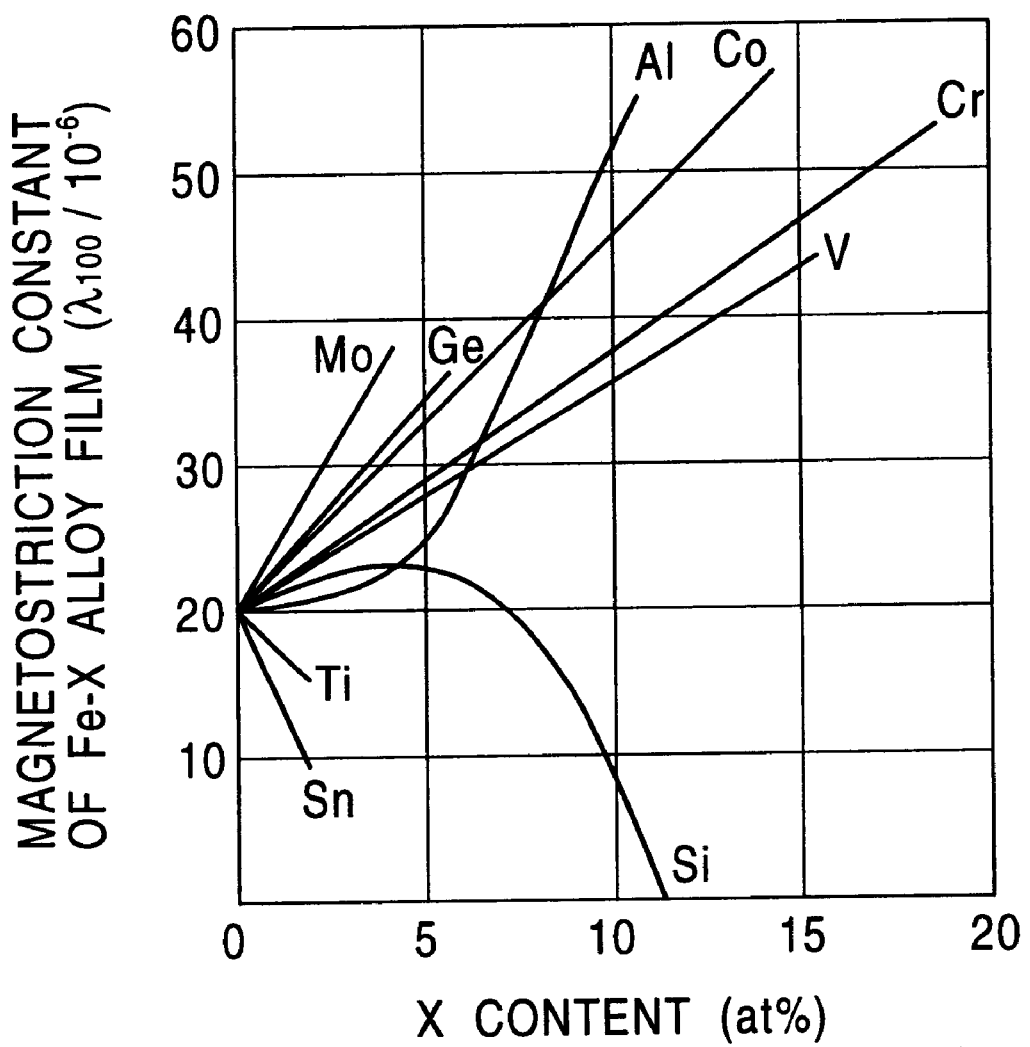
FIG. 4 is a graph showing a relationship between the content of an element X to be added to Fe and the magnetostriction constant of an Fe—X alloy film.

FIG. 4 is a graph showing a relationship between the content (at %) of an element X and the magnetostriction constant of an Fe—X alloy film when various elements (X) are added to Fe.

As shown in FIG. 4, when Ti or Sn is added to Fe, the magnetostriction constant of the Fe—Ti alloy film or Fe—Sn alloy film decreases. In particular, in elements such as Ti and Sn, even if the amount added is small, the magnetostriction constant decreases, thus showing that they are very favorable additive elements. On the other hand, when Si is added to Fe, although the magnetostriction constant of the Fe—Si alloy film decreases, as shown in FIG. 4, a significant decrease in magnetostriction constant is not observed unless the amount of Si added is set at approximately 7 at % or more.

When Si is added to an Fe—M—R alloy film, although it is believed that the magnetostriction constant can be decreased if the amount of Si added is set at approximately 7 at % or more, the contents of other elements decrease by the amount of Si added. If the content of Fe significantly decreases by the addition of Si, the magnetic permeability or the like may decrease, resulting in degradation in soft magnetic properties.

Therefore, in the present invention, although Ti, Sn, Sm, or Si is added to an Fe—M—R alloy film, more preferably, Ti, Sn, or Sm is added to an Fe—M—R alloy film, which can decrease the magnetostriction constant even if the amount added thereof is small.

In the present invention, in order to decrease the magnetostriction constant and maintain high saturation flux density while securing satisfactory soft magnetic properties, preferably, the subscript a satisfies $0 \leq a \leq 0.1$, and the subscripts X, Y, Z, and W (in atomic percent) satisfy $45 \leq X \leq 70$, $5 \leq Y \leq 30$, $0.1 \leq Z \leq 10$, and $10 \leq W \leq 40$, respectively.

In particular, preferably, the element L comprises at least one element selected from the group consisting of Ti, Sn, and Sm, and the subscript Z satisfies $0.1 \leq Z \leq 2$. A large amount of the element R such as O indicates increased resistivity, and preferably, the subscript W of the element R satisfies $30 \leq W \leq 40$.

In accordance with the present invention, an Fe—M—L—O alloy film includes an amorphous phase containing a large amount of an oxide of the element M mixed with a fine crystalline phase containing a large amount of Fe, and the fine crystalline phase contains the element L. Additionally, the element L is also included in the amorphous phase.

The crystal structure of the fine crystalline phase may include any one of a body-centered cubic (bcc) structure, a hexagonal closest packed (hcp) structure, and a face-centered cubic (fcc) structure. More preferably, the fine crystalline phase is mainly composed of a bcc structure.

The fine crystalline phase preferably has a small average crystal grain size of 30 nm or less, and more preferably, of 10 nm or less.

As described above, in the present invention, by adding an element L comprising at least one element selected from the group consisting of Ti, Sn, Sm, and Si to an Fe—M—R alloy film, the magnetostriction constant of the soft magnetic film can be decreased, and by properly adjusting the contents of Fe, the element M, the element L, and the element R, satisfactory soft magnetic properties can be obtained at the same time.

If the Fe—M—L—R alloy film is used for magnetic layers in thin film magnetic heads or magnetic cores in planar magnetic elements (such as transformers and inductors) and filters, satisfactory soft magnetic properties can be obtained, and the separation of the film or the like does not occur because of small magnetostriction.

FIG. 1 is a longitudinal sectional view of a thin film magnetic head in accordance with the present invention.

The thin film magnetic head shown in FIG. 1 is formed on the trailing end of a slider constituting a floating type magnetic head. This is a so-called "MR/inductive combined magnetic head", in which an inductive head h2 for writing is deposited on a reading head (reproducing head) h1.

A lower gap layer 2 composed of a nonmagnetic insulating material such as $Al_2O_3$ is formed on a lower shield layer 1 composed of a magnetic material. A magnetoresistive element layer 6 is formed on the lower gap layer 2. The magnetoresistive element layer 6 includes a GMR element such as a spin-valve film or an AMR element. When an external magnetic field is applied to the magnetoresistive element, electrical resistance changes, thus enabling reading of signals recorded on a recording medium such as a hard disk drive.

Numeral 4 represents a hard bias layer and numeral 5 represents a conductive layer. The hard bias layer 4 is composed of a cobalt-platinum (Co—Pt) alloy, a cobalt-chromium-platinum (Co—Cr—Pt) alloy, or the like. The conductive layer 5 is composed of copper (Cu), tungsten (W), or the like. An upper gap layer 7 is formed on the conductive layer 5. The upper gap layer 7 is composed of a nonmagnetic insulating material such as $Al_2O_3$. An upper shield layer 8 composed of a magnetic material is formed on the upper gap layer 7. In the thin film magnetic head shown in FIG. 1, the upper shield layer 8 also functions as a lower core layer of the inductive head (write head) h2.

A gap layer 10 composed of a nonmagnetic insulating material such as $Al_2O_3$ is formed on the upper shield layer (lower core layer) 8, and an insulating layer 11 composed of a resist material or other organic materials is further formed on the gap layer 10.

On the insulating layer 11, a coil layer 12, composed of a conductive material having low electrical resistance such as Cu, is spirally formed. Although the coil layer 12 is formed so as to go around a base 15b of an upper core layer 15, in FIG. 1, the coil layer 12 partially appears. An insulating layer 14 composed of an organic resin material is formed on the coil layer 12.

The upper core layer 15, composed of a magnetic material, is formed on the insulating layer 14. A tip 15a of the upper core layer 15 is joined to the lower core layer 8 with the gap layer 10 therebetween at a section facing a recording medium to form a magnetic gap having a gap length G1. A base 15b of the upper core layer 15 is magnetically joined to the lower core layer 8 through a hole made in the gap layer 10 and the insulating layer 11.

In the inductive head h2 for writing, when a recording current is applied to the coil layer 12, a recording magnetic field is induced to the lower core layer 8 and the upper core layer 15, and magnetic signals are recorded onto a recording medium such as a hard disk drive by means of a leakage magnetic field from the magnetic gap between the lower core layer 8 and the tip 15a of the upper core layer 15.

Figure 2:
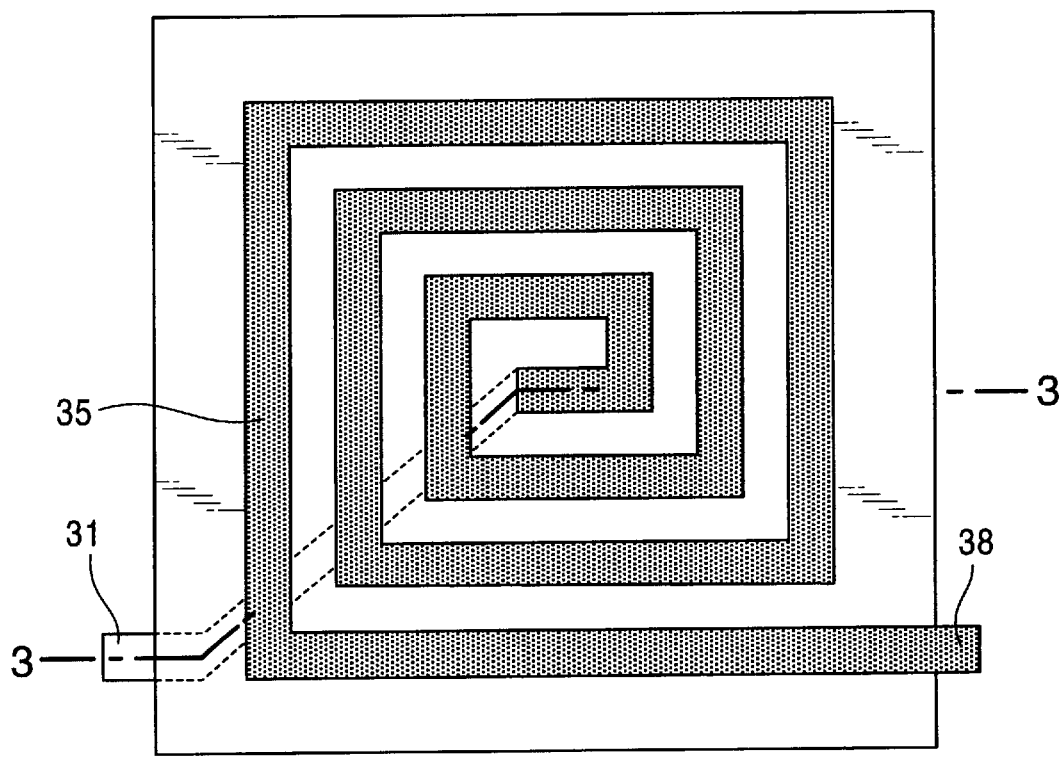
FIG. 2 is a plan view of a planar magnetic element (inductor) in accordance with the present invention.
Figure 3:
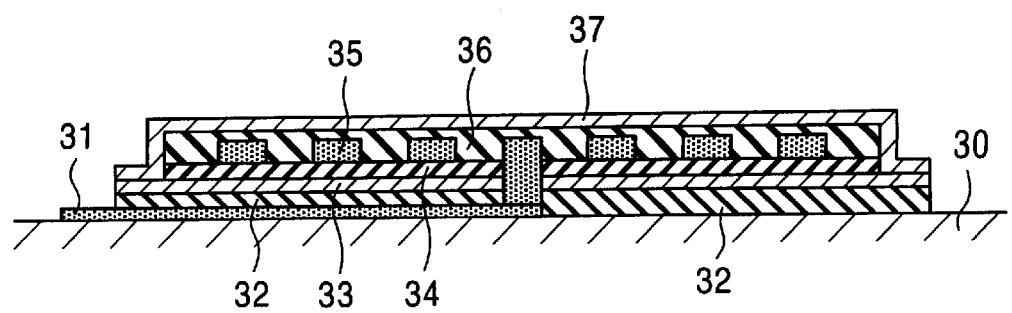
FIG. 3 is a sectional view taken along the line 3—3 of FIG. 2.

FIGS. 2 and 3 show the structure of an inductor in accordance with the present invention. FIG. 2 is a plan view and FIG. 3 is a sectional view taken along the line 3—3 of FIG. 2.

As shown in FIG. 3, an extraction electrode 31 is formed on a substrate 30. The extraction electrode 31 functions as a terminal. On the substrate 30 and the extraction electrode 31, an insulating film 32, a magnetic film 33, and an insulating film 34 are deposited in that order, and a planar coil 35 is spirally formed on the insulating film 34. The center of the planar coil 35 is connected to the extraction electrode 31 via a through hole opened in the insulating film 32, the magnetic film 33, and the insulating film 34. An insulating film 36 is formed so as to cover the planar coil 35, and a magnetic film 37 is formed on the insulating film 36. An extraction electrode 38 extends from the end of the planar coil 35 over the substrate 30. The extraction electrode 38 functions as a terminal similarly to the extraction electrode 31.

The planar coil 35 is composed of a highly conductive metal material such as copper, silver, gold, aluminum, or an alloy thereof. Depending on inductance, superimposed direct current characteristics, sizes, etc., the planar coils 35 may be disposed in series, in parallel, or with an insulating film being placed longitudinally or horizontally between the coils as required.

Additionally, a transformer can be constructed by placing a plurality of planer coils 35 in parallel and opposing the individual planar coils with the insulating film 36 therebetween. Furthermore, the planar coil 35 can be formed in various configurations by photoetching after the conductive layer is formed on the substrate. In order to form the conductive layer, pressure bonding, plating, metal spraying, a vacuum deposition process, sputtering, ion plating, screen printing and burning, or the like may be used.

It is preferable that the insulating films 32, 34, 36 be composed of a polymeric film such as a polyimide, or an inorganic film such as $SiO_2$, glass, or hard carbon. The insulating films 32, 34, and 36 may be formed by paste printing or spin coating followed by burning, hot dipping, thermal spraying, vapor phase plating, a vacuum deposition process, sputtering, ion plating, or the like.

In the present invention, the lower shield layer 1, the upper shield layer (lower core layer) 8, and the upper core layer 15 of the thin film magnetic head shown in FIG. 1, and magnetic films 33 and 37 of the inductor shown in FIGS. 2 and 3 are composed of a soft magnetic film having a composition represented by the formula:

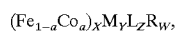

$(Fe_{1-a}Co_a)_X M_Y L_Z R_W,$ where the element M includes at least one element selected from the group consisting of Zr, Hf, V, Nb, Ta, W, Mo, and rare earth elements (excluding Sm), the element L includes at least one element selected from the group consisting of Ti, Sn, Sm, and Si, the element R includes at least one element selected from the group consisting of O, C, and N, the subscript a satisfies $0 \leq a \leq 0.1$, and the subscripts X, Y, Z. and W (in atomic percent) satisfy $45 \leq X \leq 70$, $5 \leq Y \leq 30$, $0.1 \leq Z \leq 10$, and $10 \leq W \leq 40$, respectively.

For the shield layers 1 and 8 of the thin film magnetic head, especially high magnetic permeability and a low magnetostriction constant are required, and for the core layers 8 and 15, especially high saturation flux density and high resistivity are required. For magnetic layers 33 and 37 of the inductor, especially high magnetic permeability and a low magnetostriction constant are required.

In the present invention, by adding the element L comprising at least one element selected from the group consisting of Ti, Sn, Sm, or Si to an Fe—M(such as Zr, Hf, and Ta)—O system alloy, and by properly adjusting the contents of the individual elements, the magnetostriction constant of the soft magnetic film can be decreased and satisfactory soft magnetic properties can be obtained. The element L is dissolved in Fe and decreases the magnetostriction of Fe.

In the present invention, more preferably, the element L is defined as Ti, Sn, or Sm among Ti, Sn, Sm, and Si, and the element L is added to the soft magnetic film with the subscript Z being set at 0.1≦Z≦2.

Although the magnetostriction constant of the soft magnetic film can be decreased by adding the element L, if the amount of the element L added increases excessively, the contents of Fe and other elements decrease, resulting in a decrease in magnetic permeability or the like. Thus, preferably, the amount of the element L added is as small as possible.

In the present invention, in the soft magnetic film, an amorphous phase mainly containing the compound of the element M with the element R (oxide or the like) is mixed with a fine crystalline phase mainly containing Fe having a body-centered cubic (bcc) structure, and further the element L is dissolved in Fe.

The amorphous phase containing a large amount of the compound of the element M with the element R has a high resistivity, and the entire soft magnetic film exhibits a high resistivity. By properly adjusting the amount of Fe added, the saturation flux density and the magnetic permeability can be increased. Moreover, in the present invention, by adding a trace of the element L such as Ti, the magnetostriction constant of the soft magnetic film can be decreased while maintaining satisfactory soft magnetic properties of the soft magnetic film.

In the present invention, preferably, the soft magnetic film has a magnetostriction constant of $4 \times 10^{-6}$ or less in absolute value. Preferably, the soft magnetic film has a resistivity of 400 to 1,200 $\mu\Omega \cdot cm$, and a magnetic permeability of 300 or more.

In order to form the soft magnetic film in accordance with the present invention, sputtering, a vacuum deposition process, or the like may be used. As a sputtering system, known sputtering systems may be used, such as RF diode sputtering, DC sputtering, magnetron sputtering, triode sputtering, ion beam sputtering, and facing target sputtering. Effective methods for adding oxygen ($O_2$) into the soft magnetic film include a reactive sputtering method in which sputtering is performed in an atmosphere of a mixed gas containing an inert gas such as Ar and oxygen ($Ar+O_2$) or a method in which a complex target using a chip of an oxide of the element M (such as $HfO_2$) is sputtered in an atmosphere of Ar or a mixed gas ($Ar+O_2$).

Alternatively, the soft magnetic film may be formed in an atmosphere of a mixed gas ($Ar+O_2$), using a complex target in which various pellets of the element M such as rare earth elements or the like are placed on an Fe target.

As described above, in the present invention, by adding Ti, Sn, Sm, or Si as the element L to an Fe—M—R alloy film, and by properly adjusting the contents of the individual constituent elements, the magnetostriction constant can be decreased while maintaining soft magnetic properties having an excellent high frequency characteristic.

When the soft magnetic film is used as shield layers 1 and 8 of the thin film magnetic head shown in FIG. 1, the shielding function can be improved due to high magnetic permeability and low magnetostriction, and for example, noise due to the entry of extraneous external magnetic fields into the magnetoresistive element layer 6 can be prevented. When the soft magnetic film is used as core layers 8 and 15 of the thin film magnetic head, even with an increased frequency in response to higher recording density, since the core layers 8 and 15 have high resistivity, eddy currents do not easily occur, and thus thermal loss due to eddy currents can be reduced. Additionally, by using the soft magnetic film as shield layers and core layers, because of small magnetostriction, the degradation of soft magnetic properties or the separation of the films does not easily occur in the shield and core layers.

With respect to the inductor shown in FIGS. 2 and 3, if the soft magnetic film which is small, thin, and lightweight, having excellent soft magnetic properties, is used as magnetic films 33 and 37, the size and weight of the planar magnetic element can be reduced and inductance can be improved. Although an inductor was described with reference to FIGS. 2 and 3, it may be used as a transformer by providing primary and secondary coils.

Moreover, as mobile communication apparatuses have developed, for example, the miniaturization of air-core inductors, which occupy a large space in LC filters for cellular phones, are expected.

By using the soft magnetic film in accordance with the present invention, inductance per unit area can be increased, thus enabling the miniaturization of the air-core inductors. Since the soft magnetic film has small magnetostriction, when the soft magnetic film is used as magnetic cores of inductors, transformers, and filters, the degradation of soft magnetic properties or the separation of films from the substrates does not occur.

EXAMPLES

In the present invention, soft magnetic properties of soft magnetic films were measured by using a magnetron sputtering system, in which chips of $HfO_2$, $Fe_3O_4$ and Ti were placed on a circular target of Fe, and Fe—Hf—Ti—O alloy films having different compositions were deposited on substrates by changing the number of the individual chips. As a comparative example, soft magnetic properties of a soft magnetic film were measured by placing chips of $HfO_2$ and $Fe_3O_4$ on an Fe target and depositing an Fe—M(such as Zr, Hf, or Ta)—O system alloy on a substrate. In experiments, sputtering was performed while an Ar gas was fed into the sputtering system. After deposition, annealing treatment (UFA) was performed at 400° C. for 2 hours in a static magnetic field of 2 kOe.

TABLE 1

| | Number of Chips | | | Composition (at %) | | | | | | | | Hc | Hk | λ |
|---|---|---|---|---|---|---|---|---|---|---|---|---|---|---|
| No. | $HfO_2$ | $Fe_3O_4$ | Ti | Fe | Hf | O | Ti | ρ as dp | ρ UFA | μ' | Is (T) | (Oe) | (Oe) | ($\times 10^{-6}$) |
| 1 | 26 | 14 | 1 | 47.6 | 16.1 | 35.9 | 0.41 | 1,284 | 695 | 1,093 | 1.01 | 1.2 | 6.0 | 2.8 |
| 2 | 26 | 14 | 3 | 46.2 | 16.1 | 36.7 | 0.99 | 1,515 | 788 | 594 | 0.94 | 1.3 | 4.6 | 2.0 |
| 3 | 27 | 14 | 1 | 45.6 | 16.2 | 37.9 | 0.40 | 1,773 | 865 | 665 | 0.94 | 1.1 | 5.1 | 2.2 |
| 4 | 27 | 14 | 3 | 45.5 | 16.5 | 37.0 | 1.08 | 1,913 | 929 | 314 | 0.85 | 1.3 | 4.3 | 1.5 |
| 5 | 28 | 14 | 1 | 46.3 | 16.6 | 36.6 | 0.48 | 2,139 | 986 | 514 | 0.94 | 1.1 | 4.7 | 2.1 |
| 6 | 28 | 14 | 3 | 43.7 | 17.1 | 38.2 | 1.03 | 3,224 | 1,426 | 90 | 0.80 | 1.6 | 4.3 | 0.9 |
| 7 | 28 | 14 | | 47.3 | 16.4 | 36.3 | | 1,914 | 908 | 1,322 | 0.98 | 1.0 | 5.7 | 4.5 |

"ρ as dp" in Table 1 represents resistivity before annealing, and "ρ UFA" represents resistivity after annealing. Magnetic permeability $\mu'$, saturation magnetization Is, coercive force Hc, anisotropic magnetic field Hk, and magnetostriction constant λ were measured after annealing.

In Table 1, Nos. 1 to 6 show examples and No. 7 show a comparative example. As shown in Table 1, the number of $Fe_3O_4$ chips is fixed at 14. As is clear from Table 1, as the number of $HfO_2$ chips increases, contents of Hf and O increase. Due to the increase in the contents of Hf and O, resistivity ρ increases.

On the other hand, the content of Fe decreases as the number of $HfO_2$ and Ti chips increase, and as the content of Fe decreases, the saturation magnetization Is decreases.

By the addition of Ti, the magnetostriction constant λ decreases, and as shown in Table 1, the magnetostriction constant is less than $3\times10^{-6}$. In contrast, in No. 7 in which Ti is not added, the magnetostriction constant A reaches $4.5\times10^{-6}$. That is, by adding Ti, the magnetostriction constant A can be decreased.

In Examples Nos. 1 to 6, Nos. 4 and 6 are not desirable because the magnetic permeabilities $\mu'$ and the saturation magnetizations Is are low, although the resistivities ρ are high. In particular, No. 6 is not suitable as a magnetic film for thin film magnetic heads or planar magnetic elements because the magnetic permeability $\mu'$ of 90 is significantly low. In Nos. 4 and 6, not only the contents of Hf and O, but also the content of Ti is increased in comparison with other soft magnetic films and the content of Fe is decreased.

As is clear from Table 1, although the magnetostriction decreases if the content of Ti is increased, even when the content of Ti is not increased very much, the magnetostriction constant λ can be sufficiently decreased in comparison with the comparable example (No. 7).

Figure 5:
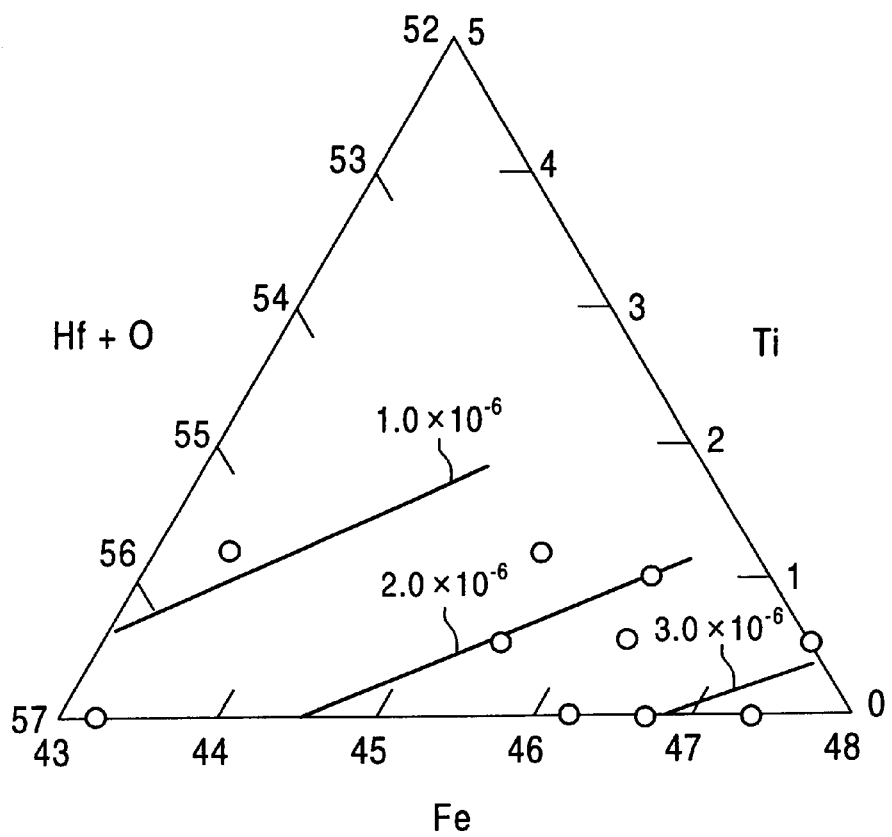
FIG. 5 is a triangular composition chart showing the relationship between the contents of Fe, Hf+O, and Ti and the magnetostriction constant of Fe—Hf—Ti—O alloy films.

FIG. 5 is a triangular composition chart which shows a relationship between the compositions of the soft magnetic films shown in FIG. 1 and the magnetostriction. As shown in FIG. 5, even if the content of Ti is 1 at % or less, the magnetostriction ($4.5\times10^{-6}$) in the comparative example (No. 7 shown in Table 1) can be reduced by half. That is, as is clear from Table 1 and FIG. 5, in order to decrease magnetostriction and ensure a high magnetic permeability $\mu'$ and saturation magnetization Is, it is preferable that the amount of Ti added be held at a trace level.

Next, in the present invention, Fe—Hf—Sn—O alloy films having different compositions were formed by placing Sn instead of Ti as chips on the Fe target, and soft magnetic properties of the individual soft magnetic films were measured. The experimental method was the same as that when the Fe—Hf—Ti—O alloy films described above had been formed.

As shown in Table 2, when Sn is added, although the magnetostriction constant λ of the soft magnetic film is not greatly decreased in comparison with when Ti is added, the magnetostriction can be more greatly reduced in comparison with the comparative example (No. 7) in Table 1.

It is clear from both Tables 1 and 2 that the magnetostriction constant λ of Fe—M(such as Zr, Hf, and Ta)—O system alloys can be decreased by the addition of Ti or Sn. However, the amount of the addition thereof is preferably at trace levels, and if it is excessively large, the contents of the other elements are decreased, and thus soft magnetic properties affected by these elements are degraded, which is disadvantageous. However, in view of the reduction of magnetostriction, as is also clear from FIG. 4, when Si is selected as an additive element, the amount of Si added must be increased. In the present invention, when the element L comprises at least one element selected from the group consisting of Ti, Sn, Sm, and Si, the subscript Z of the element L is set so as to satisfy $0.1 \leq Z \leq 10$, and when the element L comprises at least one element selected from the group consisting of Ti, Sn, and Sm, the subscript Z is set so as to satisfy $0.1 \leq Z \leq 2$.

In the present invention, based on Tables 1 and 2, the preferable magnetostriction constant λ of the soft magnetic film is set at $4\times10^{-6}$ or less in absolute value, and the resistivity ρ is set at 400 to 1,200 $\mu\Omega\cdot$cm, and the magnetic permeability $\mu'$ is set at 300 or more.

The examples which fulfill the above conditions are Nos. 1, 2, 3, 4, and 5 in Table 1, and Nos. 1, 3, and 5 in Table 2.

In accordance with the present invention described above, by adding an element L comprising at least one element selected from the group consisting of Ti, Sn, Sm, and Si to an Fe—M(such as Hf)—R(such as O) alloy film, the magnetostriction constant of the soft magnetic film can be decreased.

The subscript Z of the element L is preferably from 0.1 to 10 (at %), and more preferably, the element L comprises at least one element selected from the group consisting of Ti, Sn, and Sm and the subscript Z is from 0.1 to 2 (at %).

In accordance with the present invention, by adding the element L to the soft magnetic film and by properly adjusting the subscripts of the constituent element Fe, the element M, the element L, and the element R, the magnetostriction constant can be decreased and satisfactory soft magnetic properties can be obtained.

By using the soft magnetic films in accordance with the present invention for magnetic layers of thin film magnetic heads, planar magnetic elements, or magnetic cores of filters, excellent soft magnetic properties can be obtained, and moreover, the separation of films or the like does not easily occur due to low magnetostriction.

TABLE 2

| No. | Number of Chips | | | Composition (at %) | | | | ρ as dp | ρ UFA | $\mu'$ | Is (T) | Hc (Oe) | Hk (Oe) | λ ($\times10^{-6}$) |
|---|---|---|---|---|---|---|---|---|---|---|---|---|---|---|
| | $HfO_2$ | $Fe_3O_4$ | Sn | Fe | Hf | O | Sn | | | | | | | |
| 1 | 26 | 14 | 1 | 47.6 | 16.6 | 35.7 | 0.09 | 1,390 | 732 | 1,170 | 1.03 | 1.3 | 5.7 | 3.8 |
| 2 | 26 | 14 | 3 | 46.0 | 16.4 | 37.3 | 0.38 | 832 | 565 | 1,189 | 1.04 | 1.8 | 8.6 | 4.6 |
| 3 | 27 | 14 | 1 | 46.0 | 16.9 | 37.0 | 0.11 | 1.768 | 847 | 1,011 | 1.00 | 1.3 | 9.1 | 3.3 |
| 4 | 27 | 14 | 3 | 45.6 | 17.0 | 37.1 | 0.35 | 974 | 636 | 1,112 | 0.96 | 1.6 | 8.1 | 4.4 |
| 5 | 28 | 14 | 1 | 45.7 | 17.7 | 36.5 | 0.10 | 2,864 | 1,176 | 567 | 0.92 | 1.6 | 5.0 | 2.5 |
| 6 | 28 | 14 | 3 | 44.0 | 17.1 | 38.5 | 0.35 | 1,209 | 757 | 1,155 | 0.98 | 1.8 | 7.3 | 4.4 |

What is claimed is:
1. A soft magnetic film comprising:
Fe;
at least one element M selected from the group consisting of Zr, Hf, V, Nb, Ta, W, Mo, and rare earth elements except for Sm;
at least one element L selected from the group consisting of Ti, Sn, Sm, and Si; and
at least one element R selected from the group consisting of O, C, and N;
the film having a film structure comprising a mixture of an amorphous phase containing a large amount of the oxide of the element M and a fine crystalline phase containing a large amount of Fe, the fine crystalline phase further comprising the element L.

2. A soft magnetic film according to claim 1, wherein the fine crystalline phase comprises at least one structure selected from the group consisting of a body-centered cubic structure, a hexagonal closest packed structure, and a face-centered cubic structure.

3. A soft magnetic film according to claim 2, wherein the fine crystalline phase comprises a body-centered cubic structure.

4. A soft magnetic film according to claim 2,
wherein the fine crystalline phase has an average crystal grain size of 30 nm or less.

5. A soft magnetic film according to claim 4, wherein the fine crystalline phase has an average crystal grain size of 10 nm or less.

6. A soft magnetic film comprising a composition represented by the formula:

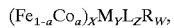
$(Fe_{1-a}Co_a)_X M_Y L_Z R_W,$ where the element M comprises at least one element selected from the group consisting of Zr, Hf, V, Nb, Ta, W, Mo, and rare earth elements except for Sm, the element L comprises at least one element selected from the group consisting of Ti, Sn, Sm, and Si, the element R comprises at least one element selected from the group consisting of O, C, and N, the subscript a satisfies $0 \leq a \leq 0.1$, and the subscripts X, Y, Z, and W (in atomic percent) satisfy $45 \leq X \leq 70$, $5 \leq Y \leq 30$, $0.1 \leq Z \leq 10$, and $10 \leq W \leq 40$, respectively;
the film having a film structure comprising a mixture of an amorphous phase containing an oxide of the element M and a fine crystalline phase containing Fe, the fine crystalline phase further comprising the element L.

7. A soft magnetic film according to claim 6, wherein the element L comprises at least one element selected from the group consisting of Ti, Sn, and Sm, and the subscript Z satisfies $0.1 \leq Z \leq 2$.

8. A soft magnetic film according to claim 6, wherein the subscript W satisfies $30 \leq W \leq 40$.

9. A soft magnetic film according to claim 6, wherein the soft magnetic film has a magnetostriction constant of $4 \times 10^{-6}$ or less in absolute value.

10. A soft magnetic film according to claim 6, wherein the soft magnetic film has a resistivity of 400 to 1,200 $\mu\Omega \cdot cm$.

11. A soft magnetic film according to claim 6, wherein the soft magnetic film has a magnetic permeability of 300 or more.

12. A soft magnetic film according to claim 6, wherein the fine crystalline phase comprises at least one structure selected from the group consisting of a body-centered cubic structure, a hexagonal closest packed structure, and a face-centered cubic structure.

13. A soft magnetic film according to claim 12, wherein the fine crystalline phase comprises a body-centered cubic structure.

14. A soft magnetic film according to claim 12, wherein the fine crystalline phase has an average crystal grain size of 30 nm or less.

15. A soft magnetic film according to claim 14, wherein the fine crystalline phase has an average crystal grain size of 10 nm or less.

16. A thin film magnetic head comprising at least one of a write head and a read head, wherein at least one magnetic layer of the write head and the read head comprises a soft magnetic film comprising a composition represented by the formula:

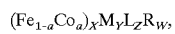
$(Fe_{1-a}Co_a)_X M_Y L_Z R_W,$ where the element M comprises at least one element selected from the group consisting of Zr, Hf, V, Nb, Ta, W, Mo, and rare earth elements except for Sm, the element L comprises at least one element selected from the group consisting of Ti, Sn, Sm, and Si, the element R comprises at least one element selected from the group consisting of O, C, and N, the subscript a satisfies $0 \leq a \leq 0.1$, and the subscripts X, Y, Z, and W (in atomic percent) satisfy $45 \leq X \leq 70$, $5 \leq Y \leq 30$, $0.1 \leq Z \leq 10$, and $10 \leq W \leq 40$, respectively;
the film having a film structure comprising a mixture of an amorphous phase containing an oxide of the element M and a fine crystalline phase containing Fe, the fine crystalline phase further comprising the element L.

17. A thin film magnetic head according to claim 16, wherein the element L comprises at least one element selected from the group consisting of Ti, Sn, and Sm, and the subscript Z satisfies $0.1 \leq Z \leq 2$.

18. A thin film magnetic head according to claim 16, wherein the subscript W satisfies $30 \leq W \leq 40$.

19. A planar magnetic element having a magnetic core comprising a soft magnetic film,
wherein the soft magnetic film comprises a composition represented by the formula:

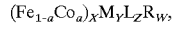
$(Fe_{1-a}Co_a)_X M_Y L_Z R_W,$ where the element M comprises at least one element selected from the group consisting of Zr, Hf, V, Nb, Ta, W, Mo, and rare earth elements except for Sm, the element L comprises at least one element selected from the group consisting of Ti, Sn, Sm, and Si, the element R comprises at least one element selected from the group consisting of O, C, and N, the subscript a satisfies $0 \leq a \leq 0.1$, and the subscripts X, Y, Z, and W (in atomic percent) satisfy $45 \leq X \leq 70$, $5 \leq Y \leq 30$, $0.1 \leq Z \leq 10$, and $10 \leq W \leq 40$, respectively;
the film having a film structure comprising a mixture of an amorphous phase containing an oxide of the element M and a fine crystalline phase containing Fe, the fine crystalline phase further comprising the element L.

20. A planar magnetic element according to claim 19, wherein the element L comprises at least one element selected from the group consisting of Ti, Sn, and Sm, and the subscript Z satisfies $0.1 \leq Z \leq 2$.

21. A planar magnetic element according to claim 19, wherein the subscript W satisfies $30 \leq W \leq 40$.

22. A filter having a magnetic core comprising a soft magnetic film, wherein the soft magnetic film comprises a composition represented by the formula:

$$(Fe_{1-a}Co_a)_X M_Y L_Z R_W,$$

where the element M comprises at least one element selected from the group consisting of Zr, Hf, V, Nb, Ta, W, Mo, and rare earth elements except for Sm, the element L comprises at least one element selected from the group consisting of Ti, Sn, Sm, and Si, the element R comprises at least one element selected from the group consisting of O, C, and N, the subscript a satisfies $0 \leq a \leq 0.1$, and the subscripts X, Y, Z, and W (in atomic percent) satisfy $45 \leq X \leq 70$, $5 \leq Y \leq 30$, $0.1 \leq Z \leq 10$, and $10 \leq W \leq 40$, respectively;

the film having a film structure comprising a mixture of an amorphous phase containing an oxide of the element M and a fine crystalline phase containing Fe, the fine crystalline phase further comprising the element L.

23. A filter according to claim 22, wherein the element L comprises at least one element selected from the group consisting of Ti, Sn, and Sm, and the subscript Z satisfies $0.1 \leq Z \leq 2$.

24. A filter according to claim 22, wherein the subscript W satisfies $30 \leq W \leq 40$.

* * * * *